United States Patent [19]
Travis et al.

[11] Patent Number: 5,101,493
[45] Date of Patent: Mar. 31, 1992

[54] DIGITAL COMPUTER USING DATA STRUCTURE INCLUDING EXTERNAL REFERENCE ARRANGEMENT

[75] Inventors: Robert L. Travis, Concord, Mass.; William R. Laurune, Maple Valley, Wash.

[73] Assignee: Digital Equipment Corporation, Maynard, Mass.

[21] Appl. No.: 368,703

[22] Filed: Jun. 19, 1989

[51] Int. Cl.⁵ .............................................. G06F 15/40
[52] U.S. Cl. ........................... 395/700; 364/DIG. 1; 364/282.1; 364/283.1; 364/246; 364/246.3; 364/262.4; 364/262.5
[58] Field of Search ... 364/200 MS File, 900 MS File

[56] References Cited

U.S. PATENT DOCUMENTS

| | | | |
|---|---|---|---|
| 4,558,413 | 12/1985 | Schmidt et al. | 364/200 |
| 4,622,633 | 11/1986 | Ceccon et al. | 364/200 |
| 4,631,664 | 12/1986 | Bochman | 364/200 |
| 4,751,740 | 6/1988 | Wright | 382/1 |
| 4,791,550 | 12/1988 | Stevenson et al. | 364/200 |
| 4,851,988 | 7/1989 | Trottier et al. | 364/200 |
| 4,864,497 | 9/1989 | Lowry et al. | 364/200 |
| 4,922,415 | 5/1990 | Hemdal | 364/200 |
| 4,928,237 | 5/1990 | Bealkowski et al. | 364/200 |
| 4,943,932 | 6/1990 | Lark et al. | 364/513 |
| 4,959,769 | 9/1990 | Cooper et al. | 364/200 |

OTHER PUBLICATIONS

Stephen Mallinson, "IBM Communications-Architectures and Directions," *Proceedings of the Int'l Conf. on Networking Technology and Architectures*, London, Jun. 1988, pp. 49-60.

*Primary Examiner*—Kevin A. Kriess
*Attorney, Agent, or Firm*—Arnold, White & Durkee

[57] ABSTRACT

A data structure comprising a header portion and a content portion. The header portion includes an external references vector including at least one external reference item that identifies an external structure. The content portion includes data, and includes a pointer that identifies an external reference item in the external references vector, thereby referencing the inclusion of the external structure in the location of the pointer in the content portion. As a further refinement, the content portion further comprises a function pointer identifying a function external to the data structure, thereby referencing inclusion of the results of processing by the external function in the data structure at the location of the function pointer.

16 Claims, 4 Drawing Sheets

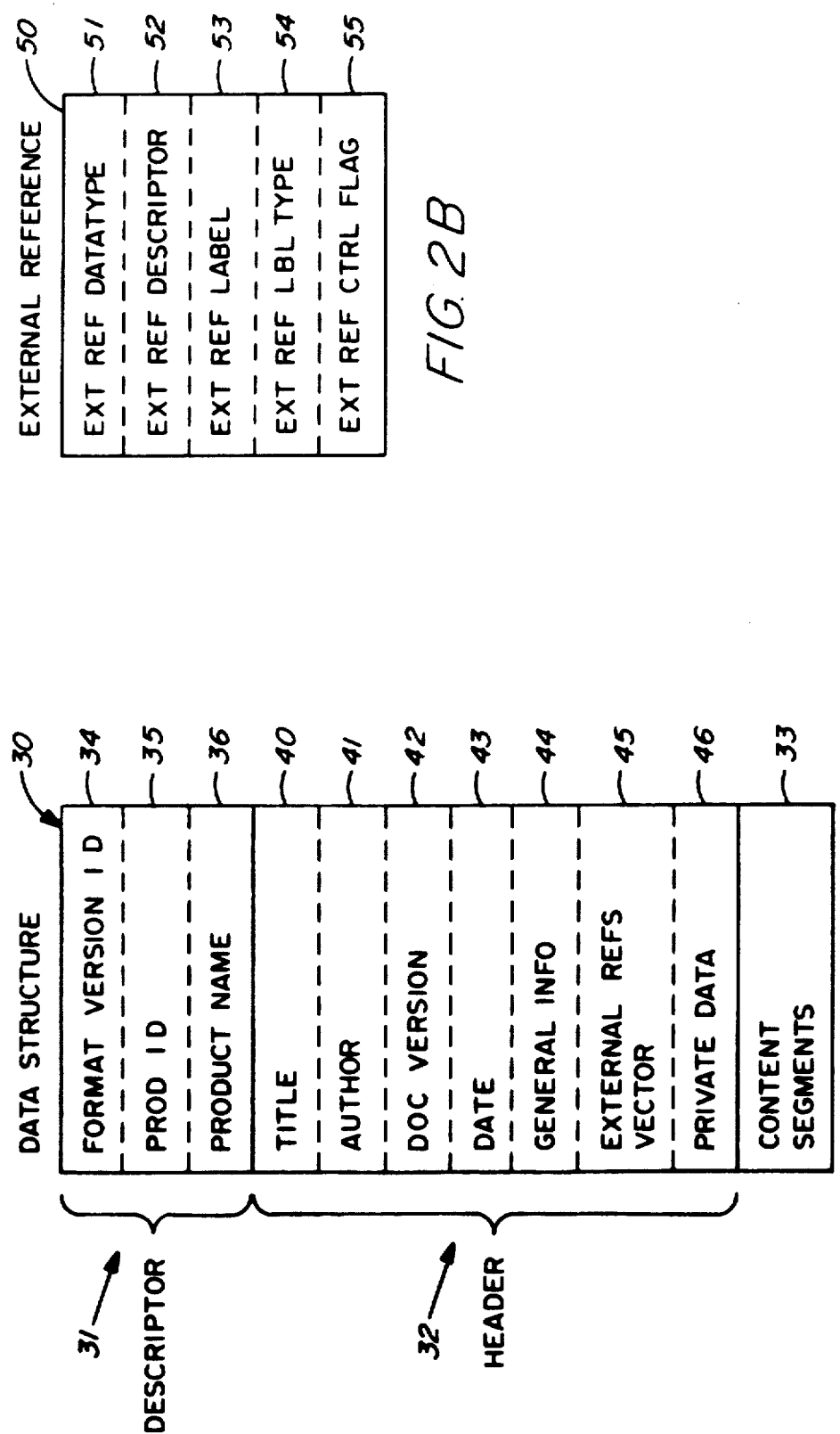

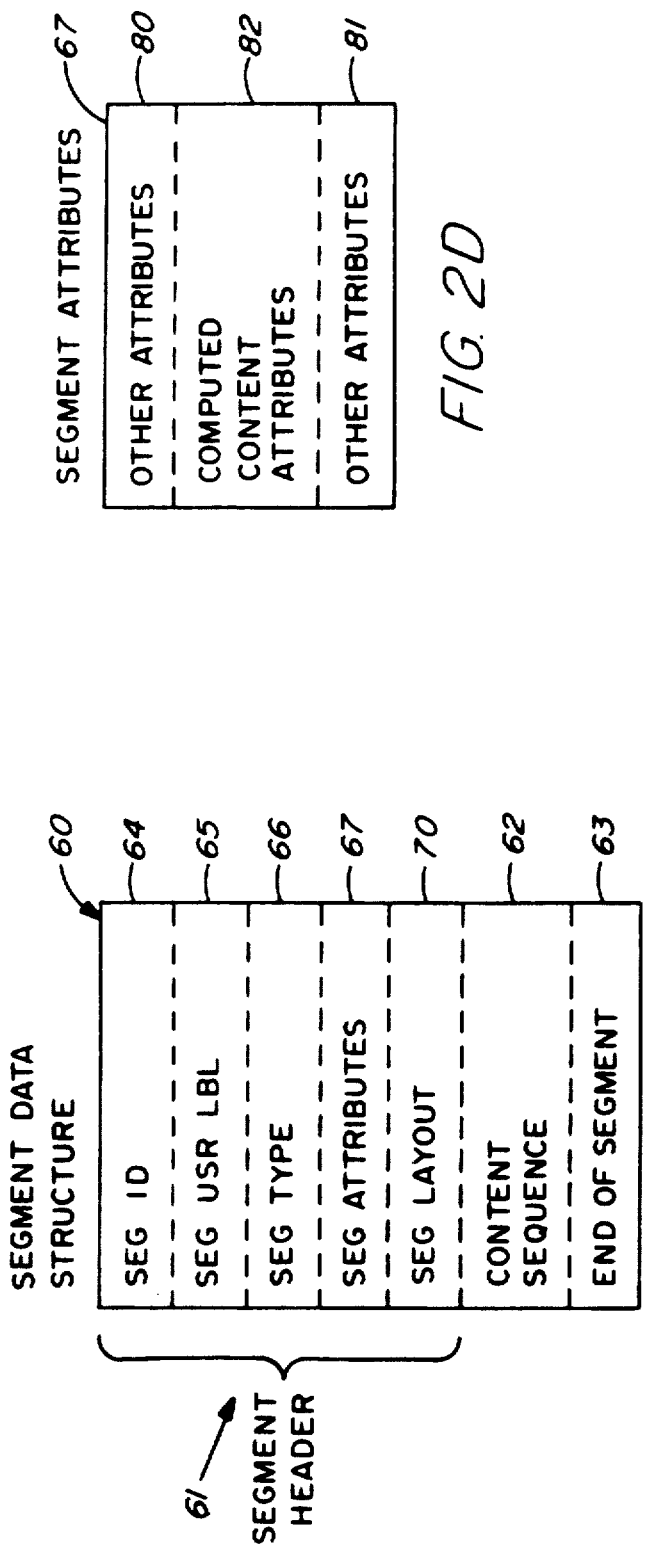

DIGITAL COMPUTER USING DATA STRUCTURE INCLUDING EXTERNAL REFERENCE ARRANGEMENT

INCORPORATION BY REFERENCE

U.S. patent application Ser. No. 07/368,681, filed June 19, 1989, in the name of Robert L. Travis, et al., entitled Information Object Transport System, incorporated herein by reference.

FIELD OF THE INVENTION

The invention relates generally to the field of digital computer systems, and more particuarly to a data structure for organizing data that is particularly useful for use in connection with documentary data.

BACKGROUND OF THE INVENTION

In a digital computer system, computer programs provided by a number of vendors typically organize data for processing in a number of diverse formats. Each vendor may use different formats for organizing the data processed by its programs, with the formats being selected to enhance the processing by the particular program. Some programs may also include conversion routines which allow the program to import data from files having selected formats to a format used by the program, and to export data from the format used by the program to another format.

In some data structures for storing data for use in, for example, document processing, the data is segmented according to the structure of the document. For example, a document is divided into a structural hierarchy, comprising for example, chapter, sections, paragraphs, figures, and so forth, and the data defining the document may also be divided into similar hierarchical structures.

SUMMARY OF THE INVENTION

The invention provides a new and improved data structure for storing data relating to, for example, documents and other items, which may contain textual and graphical elements, which facilitates reference to external structures and functions for providing data to be processed with the data contained in the data structure.

In brief summary, the invention, in one aspect, provides a data structure comprising a header portion and a content portion. The header portion includes an external references vector including at least one external reference item that identifies an external structure. The content portion includes data, and includes a pointer that identifies an external reference item in the external references vector, thereby referencing the inclusion of the external structure in the location of the pointer in the content portion. As a further refinement, the content portion further comprises a function pointer identifying an function external to the data structure, thereby referencing inclusion of the results of processing by the external function at the point corresponding to the location of the function pointer.

BRIEF DESCRIPTION OF THE DRAWINGS

This invention is pointed out with particularity in the appended claims. The above and further advantages of this invention may be better understood by refering to the following description taken in conjunction with the accompanying drawings, in which:

FIGS. 2A through 2D comprise diagrams depicting various aspects of the new data structure.

DETAILED DESCRIPTION OF AN ILLUSTRATIVE EMBODIMENT

Figure 1:
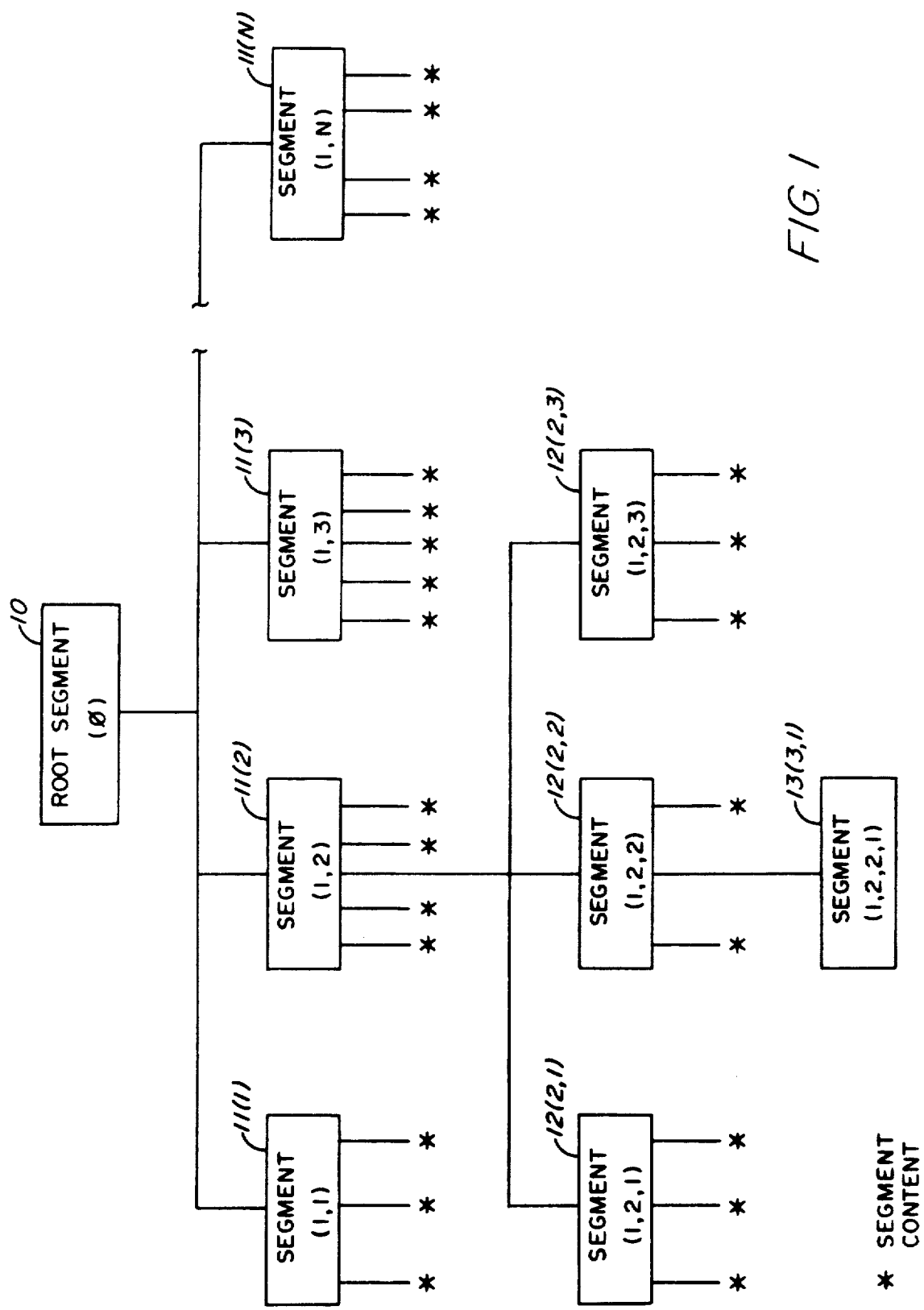
FIG. 1 is a block diagram useful in understanding the new data structure.

FIG. 1 depicts a block diagram that is useful in understanding the data structure constructed in accordance with the invention. With reference to FIG. 1, the data structure is organized in a hierarchy of nested segments, each defining a portion of the document. Each segment defines attributes which describe selected predetermined features regarding the information comprising the segment content, with each segment acquiring not only the attributes defined for the specific segment, but also the attributes of its parent segments in the hierarchy.

The hierarchy is defined by a top root segment 10 which contains all of the other segments. Beneath the root segment 10 in the illustrative block diagram depicted in FIG. 1, the root segment 10 is shown as having a plurality of second-level segments 11(1) through 11(N) (generally identified by reference numeral 11) thereunder. The second-level segments 11 may also include one or more segments thereunder. In particular, segment 11(2) is depicted as including three segments, identified as segments 12(2,1) through 12(2,3) (generally identified by reference numeral 12; the first index in each reference numeral identifies the level, under the root level, and the second index in each reference numeral identifies the order of the segment in the sequence at that level), and segment 12(2,2) is depicted as having a single segment 13(3,1).

The sequence of second-level segments 11(1) through 11(N) (generally identified by reference numeral 11), including any segments nested therein, identify the sequence of information contained in the document. The actual content for each segment, which is represented by the asterisks (*) in FIG. 1, represents the sequential documentary textual or graphical contents to be displayed, printed or otherwise processed. If a segment, such as segment 13(3,1), does not have any child segments and also does not have any indicated content, the segment may reference another segment, either inside the data structure represented by the hierarchy depicted in FIG. 1, or another data source, such as an external reference that may supply the content for the segment. If the external reference defines data, a program using the data structure depicted in FIG. 1 may use the external data directly, or it may call another program associated with the external data, to facilitate processing by the other program of the external data. The calling program may then use the processed data as the segment content.

FIGS. 2A through 2D depict in greater detail a data structure in accordance with the invention. With reference to FIG. 2A, a data structure 30 includes three primary portions, including a descriptor portion 31, a header portion 32 and a content segments portion 33. The descriptor portion 31 includes a plurality of fields, including a format version identification field 34 that identifies a format version for the data structure, a product identification field 35 that receives a product identification value that identifies the product that created the particular data structure 30, and a product name field 36 that receives a human-readable identifier for the product that created the particular data structure. The product identification in field 35 permits a user to select a file comprising the data structure, and the computer control program may use the contents of field 35 to identify the application program that created the structure, call that application program, and enable the application program to use the data structure.

The header portion 32 also includes a plurality of fields, including fields for information such as the data structure's title and author, if any, and the date on which the data structure was created or last modified. All of the fields in the header portion 32 are optional, that is, they are present if the operator who created the document contained in the structure supplies information from which the contents for the particular fields are derived. More specifically, the header portion 32 may include a title field 40, which contains a title, an author field which identifies the author or creator of the document contained in structure 30, a version identification field 42 which receives a document version control number, and a date field 43 which receives a date identifying when the document was created or last modified. In addition, the header portion may include general information control fields 44 which receives such information as the natural language of the document content, and conformance information which identifies the degree to which the document contents conforms to selected standards.

The header portion 32 may also include a private data field 46 in which an application program may store private data. The format for the data structure 30 may be used as an interchange format for facilitating the translation between data structures used by diverse application programs, and the private data field 46 may be used to store data which is otherwise not specified for the data structure 30. Such data may comprise, for example, formatting information that is recognized by one application program, but perhaps not by other applications. This ensures that the formatting and other information is not lost if the data structure 30 is used as an interchange format during a translation operation.

In addition, if the data structure 30 incorporates other data or data structures by reference, the header portion 30 includes an external references vector field 45 which stores an external reference vector, which will be described in further detail below in connection with FIG. 2C. Briefly, the external reference vector 45 includes one or more external reference entries, each identifying an external information that is incorporated by reference into the data structure 30. A segment in the content segments portion 33 may identify one of the entries in external reference vector, and in processing of the data structure 30, for example during creation of a printed document, the information from the referenced external structure is used to create the portion of the document corresponding to the segment. The external structure may, for example, comprise image data that is inserted, either directly or after a scaling operation, into the printed document. The external structure may also comprise an application program that processes identified data to provide image or other data for inclusion in the printed document. Finally, the external structure may comprise a script that defines a series of processing operations, which may be performed by one or more application programs, to provide the necessary image or other data.

The external references vector may include one or more items 50 whose detailed structure is depicted in FIG. 2B. With reference to FIG. 2B, an item 50 in the external references vector 45 includes a number of fields. In particular, the external reference item 50 includes a reference label field 51 and an external reference descriptor field 52. The contents of the external reference data type field 51 identifies the data type of the information provided by the externally referenced element. The contents of the external reference descriptor field 52 contain human-readable descriptor of the data type contained in field 51.

The external reference vector item 50 also includes an external reference label field 53 and an external reference label type field 54. The external reference label field 53 stores a value that identifies the data structure incorporated by reference. The external reference label type field 54 stores a value that identifies the type of label stored in field 53. In particular, the reference label field 51 stores a value corresponding to the name of the referenced data structure. In one embodiment, referenced external data structures may comprise files, maintained by the computer's operating system of the computer that created the data structure 30, with each file being named according to a naming convention maintained by the operating system. In addition, external data structures may be stored in a record management system, essentially comprising records maintained by the record management system, with each record being named according to a naming convention maintained by the record management system. The reference label field 51 stores the file or record name of the referenced data structure, and the reference label type field 52 stores a value indicating whether the name is according to the operating system naming convention or the record management system naming convention.

The external reference vector item 50 also includes an external reference control flag 55. The referenced data structure may be a local data structure or a global data structure, and the reference control field 53 includes a flag whose condition indicates whether the reference data structure is a local data structure or a global data structure, which may be of interest in connection with transferring the data structure 30 among nodes in, for example, a digital data processing system, as described in U.S. patent application Ser. No. 07/368,681, filed June 19, 1989, in the name of Robert L. Travis, et al., entitled Information Object Transport System and incorporated herein by reference.

The data structure 30 also includes a content segments portion 33 which includes a root segment 10 (FIG. 1) that includes one or more second-level segments 11 nested therein, and, as described above, in connection with FIG. 1, second level segments may include third-level segments 12, and so on, to define a hierarchy of segments. The sequential second-level segments 11 define the general sequential portions of the document represented by data in the data structure. Each second-level segment 11 may contain, for example, data representing the text for a paragraph or another identifiable section, such as a chapter, of a document, and a third-level segment may include lower-level portions, such as individual text lines, in which the data in the segment is encoded in, for example, ASCII text, or bit maps depicting the representations of the pixels defining the text. The segment includes layout and other attribute information identifying the layout, in the document, of the data for the segment.

In addition, a segment may comprise an external references vector pointer, which, identifies an entry in the external references vector 45 in header 32. If the segment does include such an external references vector pointer, the referenced external structure provides the required data for the segment.

The segment data structure 60, which is the data structure contained in content segments portion 33 for a segment, is defined in FIG. 2C. The content segments portion 33 includes one or more segment data structures 60. With reference to FIG. 2C, the segment data structure 60 includes a segment header portion 61, a content sequence portion 62 and an end of segment identifier field 63, which receives a value identifying the field as the end of the segment data structure 60. The segment data structure 60 is thus defined by segment header portion 61 and the end of segment identifier field 63.

As noted above, the segments may be nested. If one or more segments are nested within another segment, the lower level segments' segment data structures 60 are contained in the content sequence portion 62 of the parent segment's segment data structure 60.

The segment header portion 61 includes a number of fields. A segment identification field 64 contains a segment identification value. A segment user label field 65 contains a title or other label given to the segment by a user or creator of the segment. A segment attributes field 67 contains, among other information described below, formatting information. The formatting information may be specified in one or more named sets, and segments nested therein may specify one set of attributes by a name which may be provided in a segment type field 66. By specifying the name in the segment type field 66 of a segment nested in a higher-level, the attributes associated with the name are used in connection with the processing of the segment, to the extent that they are not specified in the segment attributes field of the nested segment. A segment layout field contain layout information describing the layout of the data contained in the segment.

As noted above, the segment attributes field 67 contains such information as the processing and presentation attributes of the segment. The segment attributes field 67 may include a number of fields, generally shown in FIG. 2D, including fields 80 and 81 that may contain such information as, for example, the type of data contained in the segment, that is, whether the segment contains ASCII text data, image data which may be encoded, for example, bitmapped form, or graphics data which may be encoded, for example, by identifying the lines and arcs in the graphical image. The attributes field 67 also indicates whether the data for the segment is in tabular form, or in a well known "Page Description Language" form.

The attributes field 67 also may include a computed content attributes field 82. If present, the contents of the content attributes field indicate that the segment content is provided by an identified structure external to the segment. In particular, the content atributes field may contain a predetermined value and segment identifier that indicate that the content of the segment is to be provided is to be copied from the segment identified by the segment identifier, and will update the contents of the segment either automatically or on request of an operator using the data structure 30. If the reference is to an external data structure, the identification of the data structure is by means of an index into the external references vector 45, identifying an item 50 that, in turn, identifies a data structure or data element. When the data structure 30 is processed for, for example, printing, the program controlling the processing may retrieve that referenced data structure and print the data contained therein as belonging to the segment.

Alternatively, the computed content attributes field 82 may contain a predetermined value and variable identifier, which may identify certain variables such as page numbers, chapter and section numbers or footnote numbers in a document. The variable value may comprise that of the most recent time the variable value was modified, or by reference to another value referenced in another, identified, segment.

Finally the computed content attributes field 82 may contain a "live link" comprising a function identifier and function parameter or data values. When the data structure 30 is processed for, for example, printing, the program controlling the processing may initiate processing by the function identified by the function identifier, in connection with data and parameters, if any, contained in the content attributes field 82, and print the data provided by the function as belonging to the segment.

The external reference vector 45, and the computed content attributes 82, thus jointly facilitate reference, from within the data structure 30, to external data structures and external functions, which are incorporated into a document which may be printed, for example, from the data structure 30. The external references vector facilitates identification of external data structures, by reference by index from within a segment. The "live link" comprising the function identifier, parameter and data values in a computed content attributes field 82 also facilitates reference to external functions which may be processed to provide data for a segment. In either case, an operator using a computer program which stores data in a data structure 30 as depicted in FIG. 2A may provide the information for the external references vector 45 and computed content attributes fields 82 of the respective segment data structures 60 either directly or symbolically while using the program.

It will be appreciated that the use of the external references vector and "live links" may also be used in data structures that are not segmented. In that case, the data represented by the external data structures identified by the external references vector and the data provided by the functions identified "live links" may be used by the program using the data structure as though existing at the point of the reference, which essentially occurs in the segmented data structure 30 (FIG. 2A).

Figure 3:
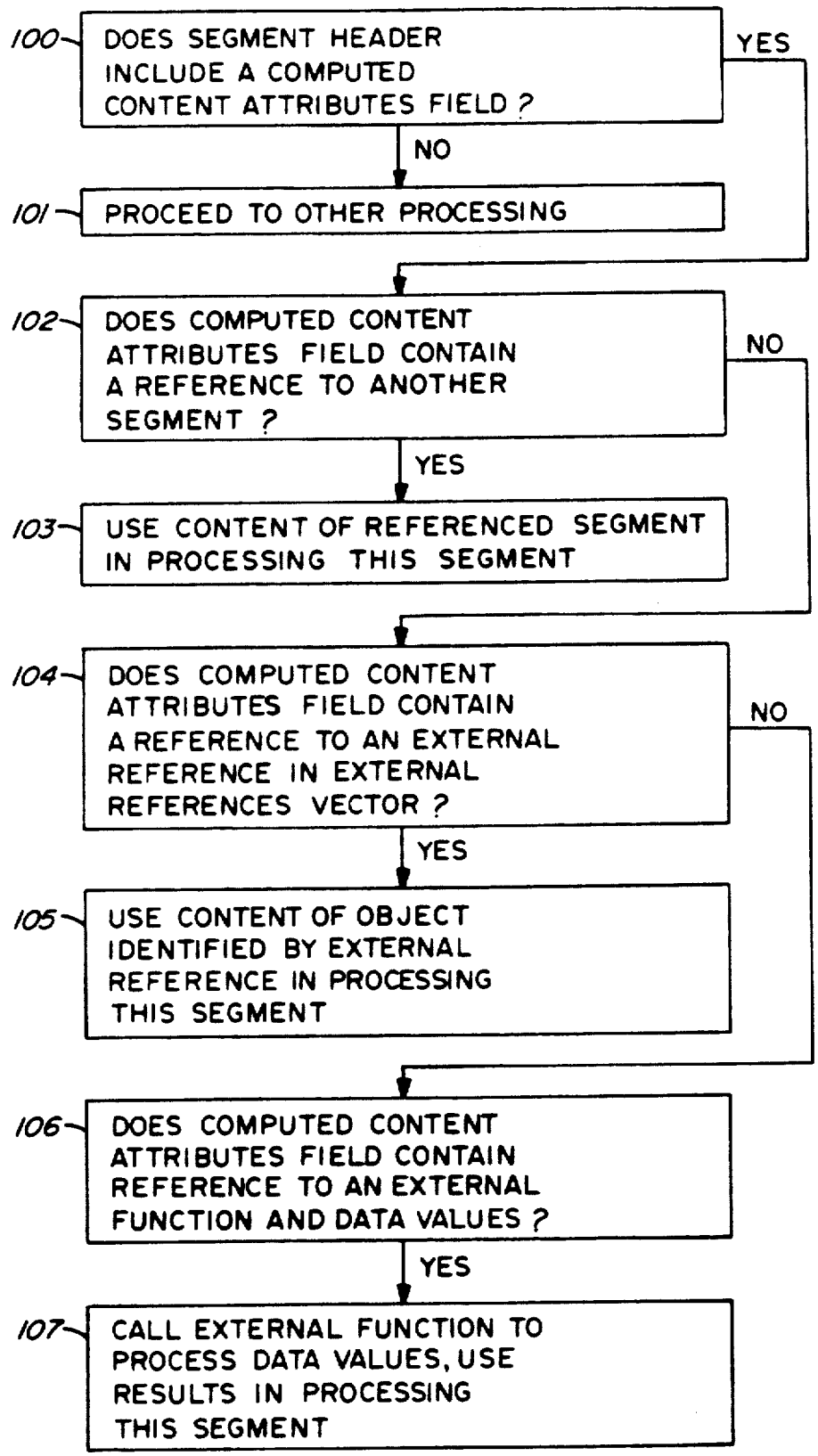
FIG. 3 depicts a flow chart illustrating a selected processing operation in connection with the new data structure.

FIG. 3 depicts a flow chart illustrating how the external reference vector 45 and a computed content attribute 82 in a segment header 61 may be used. With reference to FIG. 3, during processing of the data structure 30 to, for example, generate document data for printing, displaying, and so forth, the processor (not shown) processing the data structure 30 initially determines whether a segment header 61 contains a computed content attributes field 82 (step 100). If not, the segment data structure 60 contains all of the segment content and does not reference an external structure, and so the processor proceeds to step 101 to process the content of the segment data structure 60. However, if the processor determines that the segment header 61 does include a computed content attributes field 82, it sequences to a series of steps 102 through 107 to determine the type of computed content attribute in field 82 and perform a processing operation required for the particular type determined.

In step 102, the processor initially determines whether the computed content attributes field contains a reference to another segment in the same data structure 30. If so, the processor uses the content of the referenced segment data structure 60 in processing this segment data structure 60 (step 103).

If the processor determines in step 102 that the computed content attributes field 82 does not contain a reference to another segment in the same data structure 30, it sequences to step 104 to determine whether it contains a reference to an external reference 50 in the external references vector 45. If so, the processor uses the contents of the object identified by the referenced external reference 50 in processing this segment data structure (step 105).

On the other hand, if the processor, in step 104, determines that the computed content attributes field 82 does not contain a reference to an external reference 50 in the external references vector 45, it sequences to step 106 to determine whether it contains a reference to an external function and a set of data values. If so, the processor may enable the external function to be called and processed, using the set of data values, to produce results that are used in processing the segment (step 107).

The foregoing description has been limited to a specific embodiment of this invention. It will be apparent, however, that variations and modifications may be made to the invention, with the attainment of some or all of the advantages of the invention. Therefore, it is the data structure of the appended claims to cover all such variations and modifications as come within the true spirit and scope of the invention.

What is claimed as new and desired to be secured by Letters Patent of the United States is:

1. A digital computer comprising:
   a memory, data stored in said memory, and control information stored in said memory; and
   a data processor for processing said data in accordance with said control information;
   wherein said data and said control information are arranged as a data structure in said memory, said data structure including:
      a header portion including an external references vector for identifying an external structure; and
      a content portion including a plurality of segments, each of said segment having a header, the header of some of said segments having a computed attribute field, the computed attribute field of at least a first one of said segments containing a reference to another one of said segments, the computed attribute field of at least a second one of said segments containing an external reference pointer to the external references vector to thereby indicate inclusion of the external structure in the location of the pointer in the content portion, and the computed attribute field of at least a third one of said segments containing a function identifier and function parameter values, said function identifier identifying a function that is external to said data structure and that processes said function parameter values; and
   wherein said data processor includes a segment processor for determining whether the header of a selected segment includes a computed content attributes field, and when the header of the selected segment includes a computed content attributes field containing a reference to another segment, fetching content of said another segment and using the fetched content of said another segment in processing the selected segment, and when the header of the selected segment includes a computed content attributes field containing an external reference pointer to the external references vector, fetching content of the external structure referenced by the external reference pointer and identified by the external references vector and using the fetched content of the external structure in processing the selected segment, and when the header of the selected segment includes a computed content attributes field containing a function identifier and function parameter values, calling the external function to process the function parameter values and using results of the external function in processing the selected segment.

2. The digital computer as claimed in claim 1, wherein the external references vector includes a plurality of reference items, each identifying a respective external structure, and wherein the external reference pointer identifies one of the reference items to indicate inclusion of the identified external structure in the selected segment at the location of the external reference pointer.

3. The digital computer as claimed in claim 1, wherein the header of each of said segments further includes a segment identification for identifying said each of said segments as among other of said segments.

4. The digital computer as claimed in claim 1, wherein the header of each of said segments further includes a segment user label containing a segment name.

5. The digital computer as claimed in claim 1, wherein each of said segments has a content portion, and at least one of said segments is nested within the content portion of another one of said segments.

6. The digital computer as claimed in claim 5, wherein the header portions of at least some of said segments each include a segment attributes field having formatting information, and the header portions of at least some of said segments each include a segment type field including a name of a named set for formatting information, and wherein said segment processor includes a format processor for obtaining formatting information for a nested segment from a named segment in which the nested segment is nested when the nested segment has a segment type field including the name of the named segment, and using the obtained formatting information for the nested segment to the extent that the obtained formatting information is not specified in the segment attributes field of the nested segment.

7. The digital computer as claimed in claim 1, wherein the computed attributes field of at least a fourth one of said segments contains a variable identifier, and wherein said segment processor includes a variable processor for obtaining a value for an identified variable when the header of the selected segment includes a computed attributes field containing a variable identifier.

8. A digital computer comprising:
   a memory, data stored in said memory, and control information stored in said memory; and
   a data processor for processing said data in accordance with said control information;

wherein said data and said control information are arranged as a data structure in said memory, said data structure including:
  a header portion including an external references vector for identifying an external structure; and
  a content portion including a plurality of segments, each of said segment having a header, the header of some of said segments having a computed attribute field, the computed attribute field of at least a first one of said segments containing a reference to another one of said segments, the computed attribute field of at least a second one of said segments containing an external reference pointer to the external references vector to thereby indicate inclusion of the external structure in the location of the pointer in the content portion, and the computed attribute field of at least a third one of said segments containing a function identifier and function parameter values, said function identifier identifying a function that is external to said data structure and that processes said function parameter values, the computed attributes field of at least a fourth one of said segments containing a variable identifier, and each of said segments having a content portion, and at least one of said segments being nested within the content portion of another one of said segments; and
  wherein said data processor includes a segment processor for determining whether the header of a selected segment includes a computed content attributes field, and when the header of the selected segment includes a computed content attributes field containing a reference to another segment, fetching content of said another segment and using the fetched content of said another segment in processing the selected segment, and when the header of the selected segment includes a computed content attributes field containing an external reference pointer to the external references vector, fetching content of the external structure referenced by the external reference pointer and identified by the external references vector and using the fetched content of the external structure in processing the selected segment, and when the header of the selected segment includes a computed content attributes field containing a function identifier and function parameter values, calling the external function to process the function parameter values and using results of the external function in processing the selected segment, and when the header of the selected segment includes a computed attributes field containing a variable identifier, obtaining a value for a variable identified by the variable identifier in the computed attributes field.

9. The digital computer as claimed in claim 8, wherein the external references vector includes a plurality of reference items, each identifying a respective external structure, and wherein the external reference pointer identifies one of the reference items to indicate inclusion of the identified external structure in the selected segment at the location of the external reference pointer.

10. The digital computer as claimed in claim 8, wherein the header of each of said segments further includes a segment identification for identifying said each of said segments as among other of said segments.

11. The digital computer as claimed in claim 8, wherein the header of each of said segments further includes a segment user label containing a segment name.

12. The digital computer as claimed in claim 8, wherein the header portions of at least some of said segments each include a segment attributes field having formatting information, and the header portions of at least some of said segments each include a segment type field including a name of a named set for formatting information, and wherein said segment processor includes a format processor for obtaining formatting information for a nested segment from a named segment in which the nested segment is nested when the nested segment has a segment type field including the name of the named segment, and using the obtained formatting information for the nested segment to the extent that the obtained formatting information is not specified in the segment attributes field of the nested segment.

13. A method of operating a digital computer to process data stored in a memory in accordance with control information stored in said memory, said data and control information being arranged as a data structure in said memory, said data structure including:
  a header portion including an external references vector for identifying an external structure; and
  a content portion including a plurality of segments, each of said segment having a header, the header of some of said segments having a computed attribute field, the computed attribute field of at least a first one of said segments containing a reference to another one of said segments, the computed attribute field of at least a second one of said segments containing an external reference pointer to the external references vector to thereby indicate inclusion of the external structure in the location of the pointer in the content portion, and the computed attribute field of at least a third one of said segments containing a function identifier and function parameter values, said function identifier identifying a function that is external to said data structure and that processes said function parameter values;
said method comprising the steps of:
  determining whether the header of a selected segment includes a computed content attributes field, and
  when the header of the selected segment includes a computed content attributes field containing a reference to another segment, fetching content of said another segment and using the fetched content of said another segment in processing the selected segment, and
  when the header of the selected segment includes a computed content attributes field containing an external reference pointer to the external references vector, fetching content of the external structure referenced by the external reference pointer and identified by the external references vector and using the fetched content of the external structure in processing the selected segment, and
  when the header of the selected segment includes a computed content attributes field containing a function identifier and function parameter values, calling the external function to process the function parameter values and using results of the external function in processing the selected segment.

14. The method as claimed in claim 13, wherein the external references vector includes a plurality of reference items, each identifying a respective external structure, and wherein the external reference pointer identifies one of the reference items, and wherein the method further comprises the step of inspecting the external reference pointer to include the identified external structure in the selected segment at the location of the external reference pointer.

15. The method as claimed in claim 13, wherein each of said segments has a content portion, at least one of said segments is nested within the content portion of another one of said segments, the header portions of at least some of said segments each include a segment attributes field having formatting information, and the header portions of at least some of said segments each include a segment type field including a name of a named set for formatting information, and wherein said method further includes the step of obtaining formatting information for a nested segment from a named segment in which the nested segment is nested when the nested segment has a segment type field including the name of the named segment, and using the obtained formatting information for the nested segment to the extent that the obtained formatting information is not specified in the segment attributes field of the nested segment.

16. The method as claimed in claim 13, wherein the computed attributes field of at least a fourth one of said segments contains a variable identifier, and wherein said method further includes the step of obtaining a value for an identified variable when the header of the selected segment includes a computed attributes field containing a variable identifier.

* * * * *